United States Patent [19]

Glaser

[11] Patent Number: 4,744,552
[45] Date of Patent: May 17, 1988

[54] CRAFTSMAN'S JEWELRY SUPPORT TOOL

[75] Inventor: Donald A. Glaser, Emporia, Kans.

[73] Assignee: Glendo Corporation, Emporia, Kans.

[21] Appl. No.: 865,169

[22] Filed: May 20, 1986

[51] Int. Cl.$^4$ ............................................... B23Q 1/04
[52] U.S. Cl. ...................................... 269/71; 269/76; 269/97
[58] Field of Search ....................... 269/71, 73, 76, 81, 269/95, 97, 101, 229

[56] References Cited

U.S. PATENT DOCUMENTS

| | | | |
|---|---|---|---|
| 851,292 | 4/1907 | Kapp | 269/71 |
| 2,019,789 | 11/1935 | Mahannah | 269/71 |
| 2,586,636 | 2/1952 | Fischer et al. | 269/229 |
| 3,024,018 | 3/1962 | Manz | 269/71 |

*Primary Examiner*—Frederick R. Schmidt
*Assistant Examiner*—Judy J. Hartman
*Attorney, Agent, or Firm*—Hovey, Williams, Timmons & Collins

[57] ABSTRACT

A craftsman's tool for supporting jewelry includes an L-shaped frame pivotally coupled to a stationary support such as a work bench or the like, and a collar rotatably connected to the frame removably carries a housing which receives a shiftable member presenting movable clamping jaws for releasably holding an item of jewelry. A handrest fixed to the frame swings to an out-of-the-way position as the frame is pivoted relative to the support for improving access as may be needed to the jaws or the item of jewelry supported thereby. A third hand device for positioning an object on the item of jewelry supported by the jaws is fixedly connected to the frame so that the frame can be pivoted as necessary without disturbing the positional relationship between the object held by the third hand device and the jewelry item carried by the jaws. The tool is constructed to enable the jewelry item supported by jaws of the tool to be selectively shifted about any one of three mutually perpendicular axes of rotation, as well as along a straight upright axis as may be desired, and finger-actuated elements permit precise selective adjustment of the degree of resistance to movement of the housing relative to the support.

10 Claims, 2 Drawing Sheets

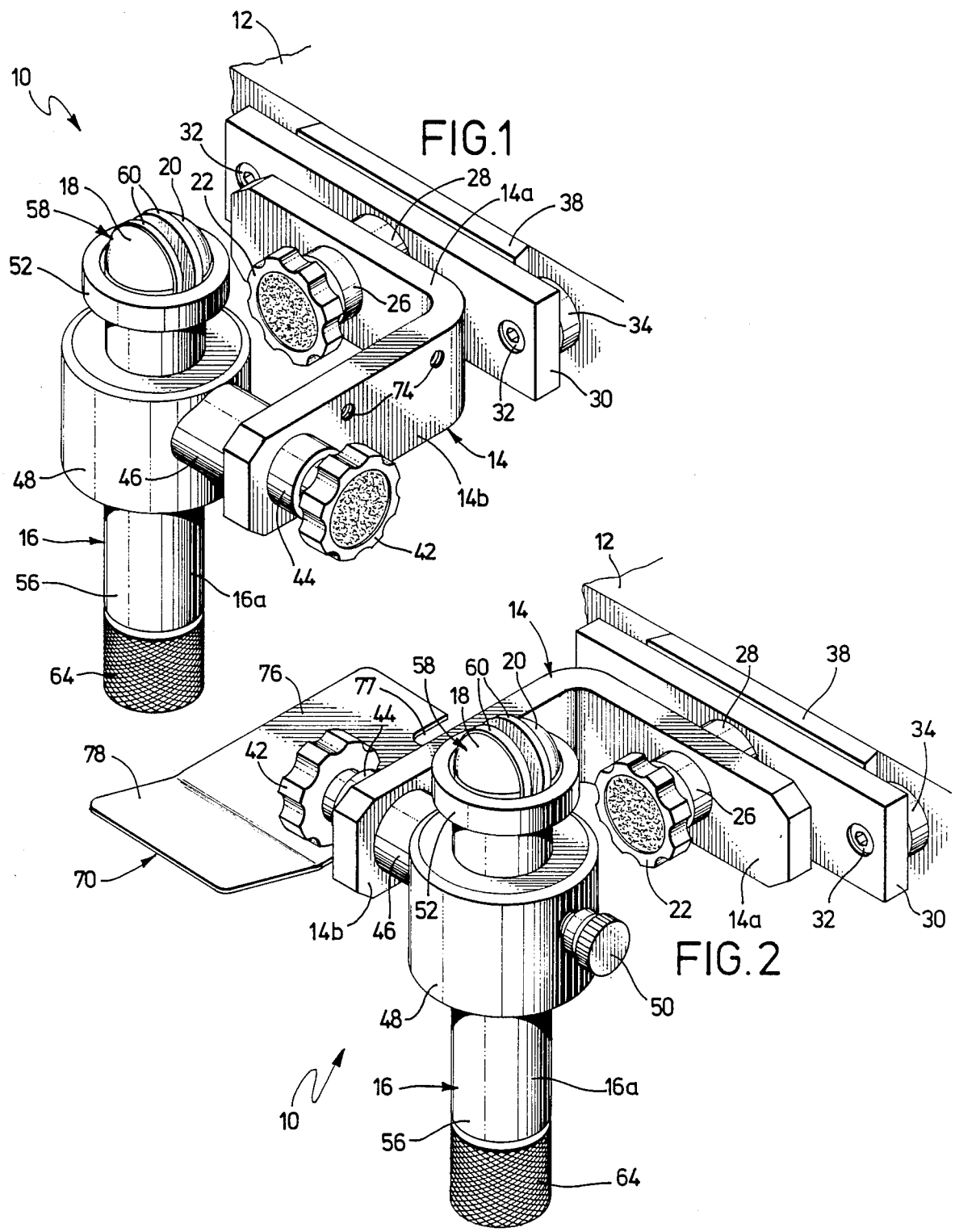

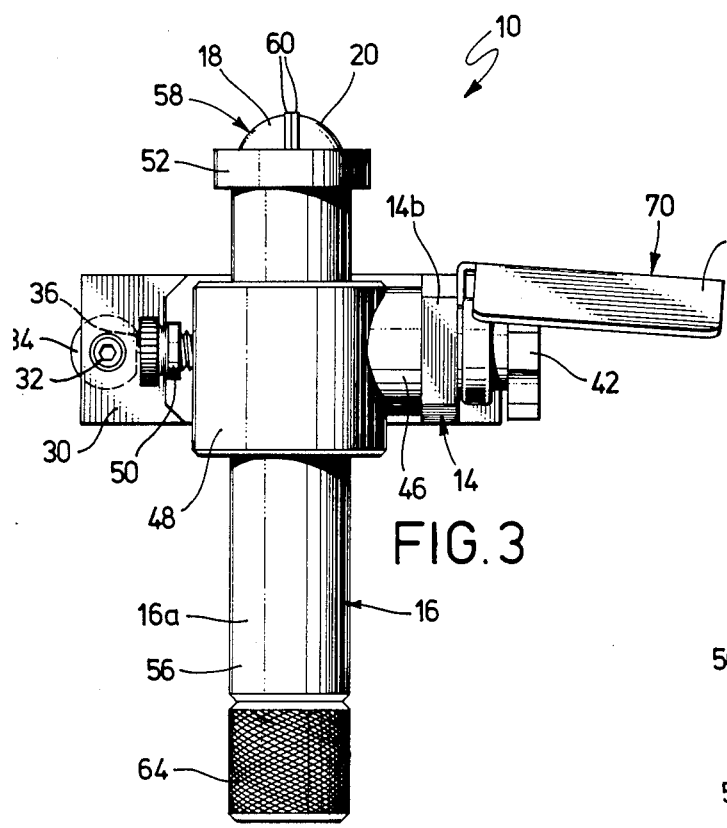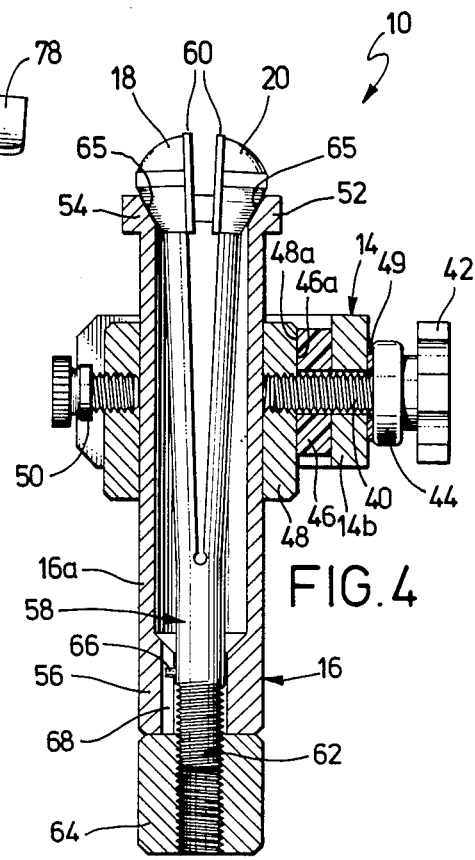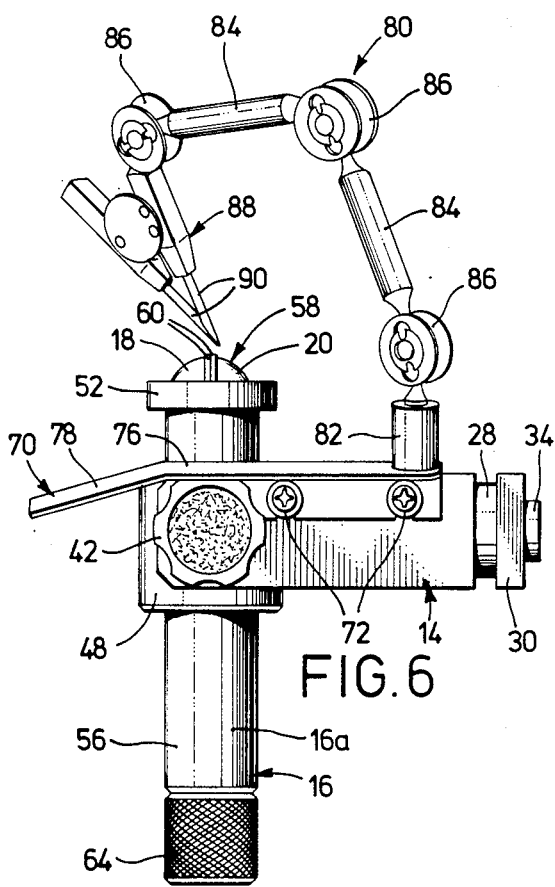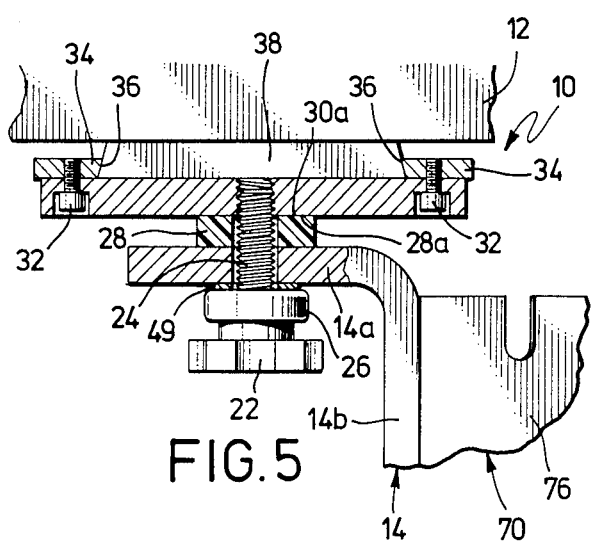

CRAFTSMAN'S JEWELRY SUPPORT TOOL

BACKGROUND OF THE INVENTION

1. Field of the Invention

This invention relates to a tool having movable, clamping jaws for releasably supporting an item of jewelry, wherein the jaws are carried by a housing that is detachably and rotatably coupled to a frame by means of finger-actuated elements permitting selective minute adjustment of the degree of resistance to rotation of the housing relative the frame. In turn, the frame is pivotally secured to a stationary support such as a work bench or the like, and a third hand device is connected to the frame in such a manner that the frame can be pivoted without disturbing the positional relationship of the third hand device relative to the jaws supporting the jewelry. A handrest secured to the frame swings to an out-of-the-way position as the frame is moved relative to the support so that access to the item of jewelry may be improved when necessary.

2. Description of the Prior Art

Jewelry crafting is an art that often demands extremely precise work within relatively tight spaces on materials that are relatively expensive to replace if mistakes occur. Jewelry crafters typically perform their work under magnification lenses so that the finished construction of the jewelry item is executed as artfully as practicable. To this end, devices such as clamps, vises or engraving blocks which hold and support the jewelry item should meet a number of criteria so that the craftsman's progress is not hindered. However, known tools for supporting jewelry have been found to exhibit drawbacks of one sort or another.

Conventional ring clamps are widely used for holding rings, and often comprise a device somewhat resembling a clothespin wherein a pair of pivotally interconnected arms have jaws which carry a resilient material for engaging a ring therebetween without marring of the ring surface. Often, a wedge is driven between the arms on the side of the pivotal interconnection remote from the jaw facings, so that the jaws can be biased together to clampingly support the ring. The ring clamp is typically of a configuration adapted for hand-held use whereby the clamp may be rested on a bench pin for use of, for example, a file on the surface of the ring.

Another common jewelry supporting tool comprises an engraving block which includes jewelry supporting jaws that are mounted on a body rotatably secured to a work bench or the like. Such engraving blocks, however, take up otherwise usable space on the work bench and also are relatively heavy and unwieldy, thereby hindering efforts to turn over the engraving block in instances where the item of jewelry has fallen between the jaws within the block. Moreover, the bulky, heavy nature of engraving block prevents convenient handheld use when necessary. Also, no means is usually provided for tilting the engraving block when it is desirable to reposition the workpiece.

In some cases, a third hand device is used in cooperation with an engraving block or, alternatively, in combination with a ring clamp that is mounted on an outwardly extending arm coupled to the work bench. The third hand device is particularly useful for holding a small object such as a decorative bead or the like against the surface of a ring clamped in the engraving block or ring clamp, so that both of the worker's hands are freed for soldering. Third hand devices are generally freely swingable in a multitude of directions to enable the object held by the third hand device to be properly positioned on the item of jewelry.

However, third hand devices inherently have a certain amount of "spring back" which resists attempts to properly position the object on an item of jewelry to a tolerance smaller than, for instance, 1/32 inch. Consequently, it is desirable practice to move the object held by the third hand device to a position adjacent the final, proper position on the ring, and thereafter shift the engraving block or ring clamp slightly to bring the ring into proper positional relationship with the object. As can be appreciated, third hand devices which are secured to a work bench cannot follow the jaws of the engraving block or ring clamp when the latter are otherwise moved or shifted to facilitate access to the item of jewelry, and consequently repositioning of the third hand device is often necessary as the work progresses.

It would be a desirable advance in the art if a craftsman's tool was provided which could sturdily support an item of jewelry in a fixed position for work thereon, yet would include a removable portion having jaws which selectively grip the jewelry item so that the latter may be moved to another location such as may be necessary for filing and the like. Preferably, means coupling the jaws to a stationary support would include finger-actuated elements offering selective degrees of resistance to movement of the jaws relative to the support, and such a tool would include a handrest that is swingable to an out-of-the-way position when desired. Additionally, the tool advantageously would utilize a third hand device in such a fashion that the jewelry may be repositioned relative to the work bench without disturbing the relative orientation between the object held by the third hand device and the item of jewelry supported by the tool.

SUMMARY OF THE INVENTION

The present invention overcomes the above noted disadvantages and represents a significant advance in the art by provision of a cylindrical, tubular housing which carries a pair of clampable, jewelry supporting jaws and that is detachably received within a collar which, in turn, is pivotally coupled to an L-shaped bracket or frame. The frame is swingably connected to a support such as a work bench or the like for movement about a generally horizontal axis, and consequently the housing as well as the jewelry supported thereby can be selectively moved about three axes of rotation, as well as linearly along an upright axis as may be necessary.

A coupling means adjustably mounting the frame to the support and a connecting means pivotally mounting the housing on the frame both include finger-actuated elements readily accessible to the fingers of one hand of the craftsman using the tool and which permit selective minute adjustment of the degree of resistance offered to movement of the frame relative to the support, and the housing relative to the frame respectively. The housing carrying the jaws has a hand engageable extension, permitting the user to adjust the degree of resistance to movement with one hand while moving the housing with the other hand, and thereafter to optionally move the housing with one hand for shifting an item of jewelry carried by the jaws relative to a finishing tool held stationary by the other hand and that is exacting a work operation on the jewelry item.

A handrest mounted on the frame is swingable to an out-of-the-way position when the frame is pivoted 180° about its horizontal axis. Additionally, the housing and the jaws therein can be removed from a channel in the collar, and the collar can be turned over and the housing reinserted so that the jaws are properly positioned to hold an item of jewelry in a proper, upright position.

In preferred forms of the invention, a third hand device is secured to the frame, whereby movement of the frame relative to the work bench does not affect the positional relationship between an object supported by the third hand device and the item of jewelry carried by the jaws, so that the work may be reoriented to facilitate access thereto. Moreover, movement of the jaw housing relative to the collar, as well as movement of the collar relative to the frame enables the jewelry item to be shifted slightly toward an object held by the third hand device to overcome inherent "spring back" which is presented by the nature of the third hand device.

Advantageously, the jaws comprise an elongated, bifurcated member integrally formed so that the jaws are yieldably biased away from each other. Movement of the member longitudinally in the housing is accomplished by means of a body or grip externally of the housing that is threadably received on an end portion of the member. The jaws are optionally each semi-hemispherical in configuration and are engageable with a complemental, frustoconical wall portion of the housing that is operable to cam the jaws laterally toward each other as the member is shifted longitudinally of the housing.

BRIEF DESCRIPTION OF THE DRAWINGS

FIG. 1 is a perspective view of the craftsman's jewelry support tool according to certain embodiments of the invention, wherein a hand rest preferably mounted on the tool has been removed for clarity;

FIG. 2 is a view somewhat similar to FIG. 1 additionally showing the handrest, wherein a frame of the support tool has been rotated 180° from the position shown in FIG. 1 relative to an adjacent work bench, and wherein a housing carrying jewelry supporting jaws has been repositioned to orient the jaws in an upwardly facing direction;

FIG. 3 is an end elevational view of the jewelry supporting tool shown in FIG. 1, showing the handrest in a position adjacent the jewelry supporting jaws for facilitating the work, and wherein the housing and the jaws supported thereby have been rotated 90° about a vertical axis from the position illustrated in FIG. 1;

FIG. 4 is a cross-sectional view of the tool shown in FIG. 3, with the handrest removed;

FIG. 5 is a horizontal, fragmentary, sectional view of the tool shown in FIG. 1, revealing the means for pivotally and releasably coupling the frame to the work bench; and FIG. 6 is a reduced, side elevational view of the tool shown in FIG. 1, with the addition of the handrest and a swingable third hand device which is used to free the hands for working.

DETAILED DESCRIPTION OF THE DRAWINGS

A craftsman's jewelry supporting tool is designated broadly by the numeral 10 in FIGS. 1-6 and is adapted for use with a normally stationary support such as a work bench 12 (FIGS. 1, 2 and 5), table or the like. The tool 10 includes an elongated, L-shaped frame member or frame 14, and a leg 14a of the frame 14 is pivotally secured to the work bench 12, while another leg 14b of frame 14 is pivotally secured to a housing 16 carrying a pair of jewelry supporting jaws 18, 20, to be described in more detail hereinafter.

Referring to FIG. 5, a knob 22 is fixed to a threaded stud 24 which extends through a ball bearing 26, a hole in leg 14a of the frame 14, and a spacer 28. The stud 24 is threadably received within a complemental opening of a plate 30, and the latter is secured by screws 32 to cylindrical shoes 34 (see also FIG. 3) each having a flattened edge 36 which contacts inclined sides of a plate-like mount 38 that is, in turn, fixedly secured to one side of the work bench 12. The sides of the mount 38 lie in planes which converge in an upwardly direction so that the tool 10 may be detached from the mount 38 by lifting the plate 30 until the edges 36 of shoes 34 clear the mount 38.

Turning now to FIG. 4, the leg 14b of the L-shaped frame 14 remote from knob 22 has a hole which receives a threaded stud 40 fixed to a knob 42. A ball bearing 44 is received on the stud 40 adjacent the knob 42, and the stud 40 extends through a cylindrical spacer 46 which has an end portion formed to a saddle-like configuration (see also FIGS. 1 and 3) for complemental engagement with an outer surface of a generally cylindrical collar 48. As shown in FIG. 4, the stud 40 is threadably received within a complemental hole formed in one side of the collar 48.

Consequently, the knob 22, stud 24, bearing 26, spacer 28, and plate 30 comprise a finger-actuated coupling means mounting the frame 14 to the work bench 12 for selective movement of the frame 14 in either direction about a horizontal axis of rotation. Also, complete loosening of the stud 24 from the plate 30 will enable removal of the frame 14 from the plate 30 if desired. The knob 42, in association with stud 40, ball bearing 44, spacer 46 and the threaded hole of collar 48, comprise a finger-actuated connecting means for enabling selective movement of the collar 48 about an axis of rotation that is substantially perpendicular to the pivotal axis of movement of the frame 14 relative to the support or work bench 12. The knob 42 can optionally be loosened sufficiently to withdraw stud 40 from collar 48, and thereby detach collar 48 from frame 14 when desired. An annular disc spring 49 (FIGS. 4 and 5) is mounted on studs 24, 40 between bearings 26, 44 respectively and frame 14 for precisely controlling frictional resistance to movement of frame 14 relative to work bench 12 and collar 48 respectively.

As can be appreciated, the annular disc spring 49 mounted on stud 24 (FIG. 5) urges bearing 26 and knob 22 away from frame member leg 14a and thereby yieldably bias in a direction toward each other those walls in sliding, mutual engagement during pivoting of frame 14 about a horizontal axis of rotation. For example, if smooth wall 28a of spacer 28 is in sliding engagement with smooth wall 30a of plate 30 during pivoting of frame member leg 14a about the horizontal axis, then spring 49 functions to bias the walls 28a, 30a toward each other. Likewike, disc spring 49 mounted on stud 40 (FIG. 4) urges bearing 44 and knob 42 in a direction away from frame member leg 14b and thereby yieldably biases those walls in mutual, sliding interengagement during movement of the collar 48 about a second axis of rotation perpendicular to the aforementioned horizontal or first axis of rotation. As another example, if smooth wall 48a of collar 48 is in sliding interengagement with a smooth wall 46a of spacer 46 during pivotal movement of the collar 48 about the second axis of rotation, spring 49 simultaneously urges walls 46a, 48a toward each other for enabling precise control over the frictional resistance of movement of collar 48 relative to frame 14.

Knob 22, stud 24, bearing 26, spacer 28 and the disc spring comprise finger-actuated elements that permit selective minute adjustment of the degree of resistance to movement of the frame 14 relative to work bench 12. Likewise, knob 42, stud 40, bearing 44, spacer 46 and the disc spring comprise finger-actuated elements which permit selective minute adjustment of the degree of resistance to movement of collar 48 relative to frame 14. Consequently, the user can grip a housing extension 16a of housing 16 with one hand while carefully adjusting either of the knobs 22,42 to obtain knowledge of the degree of resistance to movement. A precise, relatively slight resistance to movement may be desired, for instance, if it is desired to move the housing 16 with one hand while exacting a work operation on a jewelry item with the other hand. In contrast, a higher resistance to movement of the housing 16 may be necessary in cases where the jewelry must be steadily retained in a fixed position while both hands are away from the housing and instead are used to hold other tools for performing work operations.

The housing 16, which is preferably elongated, tubular and cylindrical, is received in a cylindrical channel of the collar 48 as shown in FIGS. 1-4 and 6, and a thumb screw 50 threadably received within a complemental hole of the collar 48 remote from the spacer 46 is selectively engageable with the housing 16. As such, the thumb screw 50 enables the collar 48 to be releasably secured to the housing 16 in any one of a number of positions along the length of the latter. Additionally, loosening of the thumb screw 50 allows the cylindrical housing 16 to be rotated about its longitudinal axis relative to the collar 48, or, alternatively, the housing 16 may be completely removed from the collar 48 when desired.

Viewing FIG. 4, the housing 16 has an enlarged, first end portion 52 having a generally frustoconical wall portion 54 therein. The housing 16 also has a second end portion 56 that is remote from the first end portion 52.

An elongated, bifurcated member 58, as best seen in FIG. 4, is shiftably received in the housing 16 and presents jaw means or the first jaw 18 and the second jaw 20, which jaws 18, 20 extend outwardly from the first housing end portion 52. The member 58 is advantageously integrally formed of a metallic material which inherently yieldably biases the jaws 18, 20 away from each other. A jaw facing 60, optionally comprised of a material such as polypropenate, is secured to each of the jaws 18, 20 to substantially preclude marring of the surface of items of jewelry carried by the jaws 18, 20.

The member 58, which has generally cylindrical outer wall surfaces, is integrally coupled to a threaded element 62 which extends outwardly through the second end portion 56 of housing 16. A body, such as a knurled, cylindrical grip 64 is threadably received on the element 62 externally of the housing 16 adjacent the second end portion 56. Rotation of the grip 64 relative to the element 62 effects shifting of the member 58 longitudinally within the housing 16.

The first jaw 18 and the second jaw 20 have generally semi-hemispherical walls 65 that are complementally engageable with the frustoconical wall portion 54 of the first end portion 52 of housing 16. Longitudinal shifting of the member 58 by means of rotation of grip 64 causes the housing wall portion 54 to cam the jaws 18, 20 inwardly toward each other against the bias inherently provided by the bifurcated member 58. A pin 66 is fixed to the member 58 and is slidably received within a slot 68 formed in the second end portion 56 of housing 16, to preclude rotation of the member 58 relative to the housing 16.

As illustrated in FIGS. 2, 3, 5 and 6, a handrest 70 is connected to the frame 14 in adjacent relationship to the housing 16 by means of screws 72 (FIG. 6) received within holes 74 (FIG. 1) of one leg of the frame 14. The handrest 70 has a portion 76 which extends outwardly from the frame 14 in a first plane, as well as a portion 78 that is integrally connected to the portion 76 and which extends outwardly from the latter at an inclination from the same.

Placement of the handrest 70 on the swingable frame 14 enables movement of the handrest between a position for use and a second, out-of-the way position of nonuse. When the frame 14 is pivoted about stud 24 to the orientation shown in FIGS. 1 and 3-6, the portion 76 of handrest 70 lies in a first generally horizontal reference plane adjacent the jaws 18, 20 so that a hand of the worker can be at rest in a steady position. When knob 22 is loosened and frame 14 is pivoted about stud 24 to the position shown in FIG. 2, portion 76 of handrest 70 lies in a second generally horizontal reference plane that is below the aforementioned first generally horizontal reference plane so that access to the jaws 18, 20 is facilitated as may be needed. Note also that the construction of the tool 10 allows movement of the handrest 70 from the righthand side of the jaws 18, 20 as shown in FIG. 1 to the lefthand side of the jaws 18, 20 when the frame 14 is pivoted to the position shown in FIG. 2, so that the right hand of the craftsman might be provided with an unimpeded approach to an item of jewelry that is carried by jaws 18, 20.

The configuration of the collar 48 enables the jaws 18, 20 to face in an upward direction regardless of whether the frame 14 is in the position shown in FIG. 1 or in the position shown in FIG. 2. To this end, thumb screw 50 can be loosened and housing 16 removed from the collar 48 and thereafter the collar 48 can be turned over, and the housing 16 reinserted in the opposite direction through the channel in collar 48. Alternatively, if enough clearance is available, the knob 42 can be loosened and the collar 48 rotated about the longitudinal axes of the stud 40 to reposition the jaws 18, 20 in an upwardly direction without removal of the housing 16 from the collar 48.

Referring now to FIG. 6, a third hand device 80 is detachably secured to the handrest 70 and includes a base 82 and two arms 84, 84 that are interconnected by pivot clamps 86. A gripping means 88, coupled to the outermost pivot clamp 86, includes two fingers 90 that are yieldably biased toward each other for releasably supporting an object (not shown). The third hand device 80 can be shifted to a generally arched or inverted U-shaped configuration, as illustrated, to position an object on the jewelry item while enabling the worker's hands to reach under the arch as may be desired to access the jewelry item from any horizontal direction.

The three pivot clamps 86 enable the arms 84 and thereby the gripping means 88 to swing in a multitude of directions as may be desired. The pivot clamps 86, which comprise two circular plates having spaced, aligned holes to support spherical portions on each end of the arms 84, are adjustable to a degree such that the arms 84 and thereby the gripping means 88 may be moved by hand to a desired orientation but thereafter will remain steadily in place. The third hand device 80 is particularly useful, for example, when it is desired to solder an object such as a bead or decorative leaf to a surface of a ring, since the fingers 90 are operable to support the object in adjacent relationship to the item of jewelry supported by jaws 18, 20 so that both hands of the worker are freed for the soldering operation.

Location of the third hand device 80 on the frame 14, by means of connection of base 82 to handrest 70 that is fixedly secured to frame 14 by screws 72, is particularly advantageous since the frame 14 can be pivoted around the stud 24 to swing the jaws 18, 20 to any one of a number of positions without disturbing the relative orientation between the gripping means 88 and the jaws 18, 20. For instance, if it is desirable to solder an object supported by fingers 90 to a ring carried by jaws 18, 20, the third hand device 80 can be shifted to correctly position the object on the ring, and thereafter the frame 14 can be tilted to facilitate the soldering operation as may be necessary without moving the object relative to the ring. Movement of the frame 14 for facilitating soldering can be useful, for example, in cases where it is desired to retain the solder in a horizontal orientation so that the same does not run or drip down the sides of the ring.

Typically, the third hand device 80 inherently has a certain amount of "spring back" which prevents precise positioning of an object gripped by the fingers 90 on an item of jewelry held by jaws 18, 20. For example, an object supported by the third hand device 80 usually can be positioned no closer than 1/32 inch from the desired location due to the construction of pivot clamps 86. In such a case, the third hand device 80 is initially moved to bring the object held by fingers 90 to an approximate position adjacent jewelry item supported by jaws 18, 20, and thereafter thumb screw 50, or alternatively knob 42, can be loosened for shifting of the housing 16 as may be necessary to prcisely bring the object held by fingers 90 to the desired location on the jewelry item supported by jaws 18, 20.

In instances where neither the use of the handrest 70 or the third hand device 80 is necessary, movement of the frame 14 to the orientation shown in FIG. 2 swings the third hand device 80 to an out-of-the-way position, in depending relation to handrest 70. However, in cases where the use of handrest 70 is unnecessary but use of third hand device 80 is advantageous, the latter may be detached from a slot 77 (FIG. 2) of handrest 70 and mounted on the opposite side thereof.

As can now be appreciated, the jewelry supporting tool 10 is constructed to allow an item of jewelry held by the jaws 18, 20 to be selectively rotated about three mutually perpendicular axes, as well as to be shifted in straight line along a vertical axis. In particular, frame 14 is swingable about stud 24, and collar 48 supporting the housing 16 is pivotal about the longitudinal axis of stud 40. The housing 16 can rotate about the longitudinal axis of the latter relative to the collar 48, and the housing 16 may also be longitudinally shifted relative to the collar 48 to move the jaws 18, 20 along a vertical axis.

As such, placement of the third hand device 80 in fixed relation to the frame 14 is desirable over conventional practice utilizing a third hand device affixed to a stationary support such as a work bench, since the tool 10 enables the housing 16 to be shifted about two rotational axes i.e., around stud 40 and the longitudinal axis of housing 16), as well as longitudinally within the collar 48, so that the jewelry item supported by jaws 18, 20 can be properly aligned with an object gripped by fingers 90. At the same time, once the object is in the desired location, pivotal movement of the frame 14 around stud 24 to facilitate access to the work does not disturb the positional relationship between the object held by fingers 90 and the jewelry item carried by jaws 18, 20.

I claim:

1. For use with a support such as a work bench, a craftsman's tool for supporting jewelry comprising:
   frame means;
   a coupling means for adjustably mounting the frame means on the support permitting selective pivoting of the frame means about a first axis of rotation;
   jaw means including a first jaw and a second jaw movable toward and away from a jewelry clamping position adjacent said first jaw for releasably clamping an item of jewelry therebetween;
   means for selectively moving said second jaw toward said jewelry clamping position thereof,
   there being a housing extension on said jaw means for grasping by the craftsman in one hand to adjust the position of the item of jewelry as the craftsman performs required operations on the item of jewelry using his other hand;
   connecting means for pivotally mounting the jaw means on the frame means allowing selective pivoting of the jaw means about a second axis of rotation at an angle with respect to said first axis of rotation,
   said connecting means including components carrying the jaw means in disposition for pivoting of the jaw means about a third axis of rotation at an angle with respect to said first and second axes of rotation,
   said coupling means and the connecting means including finger-actuated elements readily accessible to the fingers of one hand of the craftsman using the tool while the jaw means holding the jewelry is manipulated into desired disposition with the craftsman's other hand, said finger-actuated elements permitting selective minute adjustment of the degree of resistance to rotation of the frame means about said first axis and pivoting of the jaw means about the second axis offered by said coupling means and connecting means respectively whereby the craftsman has total selective control over the position of the item of jewelry during performance of exacting work operations thereon including shifting of the jewelry as the work proceeds,
   said coupling means including a pair of smooth walls in mutual interengagement and smoothly slidable relative to each other in directions along an arc extending about said first axis of rotation in transverse relation thereto during said pivoting of said frame member about said first axis,
   said connecting means including a pair of smooth walls in mutual engagement and smoothly slidable relative thereto in directions along an arc extending about said second axis of rotation in transverse relation thereto during said pivoting of said jaw means about said second axis,
   said finger actuated elements including means for yieldably biasing said pair of smooth walls of said coupling means toward each other and for yieldably biasing said pair of smooth walls of said connecting means toward each other to enhance said selective minute adjustment of the degree of resistance to rotation of the frame means about said first axis and pivoting of said jaw means about said second axis.

2. A tool as set forth in claim 1, wherein said frame means includes a pair of fixedly joined legs, one of the legs being in proximal relationship to said support when the tool is mounted thereon, said coupling means including a unit for selectively securing said one leg of frame means to said support, a first finger actuated element rotatable about said first axis, disposed outboard of said one leg away from the support and friction providing means joined to said first finger actuated element, rotatable thereby and having a part projecting through said one leg of the frame means and rotatably received by said one frame leg securement unit for presenting a variable resistance to rotation of said first leg and thereby the frame means about said first axis of rotation thereof in response to rotational manipulation of the first finger actuated element by the craftsman.

3. A tool as set forth in claim 1, wherein said frame means includes a pair of fixedly joined legs, one of the legs being in proximal relationship to said support when the tool is mounted thereon, and the second leg extending away from the first leg, said connecting means including collar means surrounding the housing extension in proximal relationship to said second leg of the frame means, a second knob disposed outboard of the second leg away from the collar means and friction providing means joined to said second finger actuated element, rotatable thereby, having a part projecting through said second leg of the frame means and rotatably received by said collar means for presenting a variable resistance to rotation of said collar means and thereby the jaw means about said second axis of rotation thereof in response to rotational manipulation of the second finger actuated element by the craftsman.

4. A tool as set forth in claim 1, wherein said frame means includes a pair of fixedly joined legs, one of the legs being in proximal relationship to said support when the tool is mounted thereon and the second leg extending away from the first leg, said connecting means including collar means surrounding the housing extension in proximal relationship to said second leg of the frame means, said housing extension being of cylindrical configuration and the collar means having a collar section complementally surrounding the cylindrical housing in sliding and rotational engagement therewith, and a third finger actuated element having a part thereon threaded through the collar section and frictionally engaging an adjacent surface of the cylindrical housing to permit selective adjustment of the friction offered to rotational as well as longitudinal sliding movement of the cylindrical housing relative to the collar and thereby the frame means.

5. The invention as set forth in claim 1, wherein said coupling means includes a mount having sides which converge in an upwardly direction, and said coupling means further includes shoe means presenting flattened edge portions detachably engageable with said sides of said mount for enabling selective removal of said frame means from said support.

6. The invention as set forth in claim 1; and including a third hand device connected to said frame means for movement therewith, said device including gripping means for releasably supporting an object, said device being adjustably movable for positioning said gripping means adjacent said jaw means.

7. The invention as set forth in claim 1; and including a hand rest connected to said frame means in adjacent relationship to said jaw means, said hand rest being of a width and breadth to permit comfortable support of a worker's hand thereon.

8. The invention as set forth in claim 7; and including a housing supporting said jaw means, and wherein said connecting means includes a collar having a bore, and wherein said housing can be received in said bore in a selected one of either of two oppositely oriented directions.

9. The invention as set forth in claim 1; and including a housing receiving said first jaw and said second jaw, said housing including a wall portion engageable with said second jaw for camming the latter laterally toward said first jaw.

10. The invention as set forth in claim 9, wherein said first jaw and said second jaw are integrally formed on one end of an elongated member, and wherein said elongated member is longitudinally shiftable relative to said housing for camming said second jaw laterally toward said first jaw.

* * * * *